US006732208B1

(12) United States Patent
Alsaadi et al.

(10) Patent No.: US 6,732,208 B1
(45) Date of Patent: May 4, 2004

(54) LOW LATENCY SYSTEM BUS INTERFACE FOR MULTI-MASTER PROCESSING ENVIRONMENTS

(75) Inventors: Adel M. Alsaadi, Sunnyvale, CA (US); Vidya Rajagopalan, San Carlos, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 0 days.

(21) Appl. No.: 09/318,551

(22) Filed: May 27, 1999

Related U.S. Application Data

(60) Provisional application No. 60/121,807, filed on Feb. 25, 1999.

(51) Int. Cl.$^7$ .............................................. G06F 13/00
(52) U.S. Cl. ......................... 710/112; 710/107; 710/53; 710/57
(58) Field of Search ................................. 710/104, 105, 710/107, 110, 112, 118, 125, 200, 240, 241–243, 29, 58, 60–61, 52, 53, 54, 57

(56) References Cited

U.S. PATENT DOCUMENTS

| | | | |
|---|---|---|---|
| 5,091,846 A | | 2/1992 | Sachs et al. |
| 5,469,435 A | * | 11/1995 | Krein et al. ................ 710/115 |
| 5,504,874 A | | 4/1996 | Galles et al. |

(List continued on next page.)

OTHER PUBLICATIONS

Data Sheet for IDT's RC5000 64–bit Microprocessor, Integrated Device Technology, Santa Clara, CA, 1998.
User's Manual for IBM PowerPC 603e, Chapter 8—Systems Interface Operation, International Business Machines Corporation, 1998.
MIPS R4000 Microprocessor User's Manual, 2$^{nd}$ Edition, by Joe Heinrich, located at URL http://www.mips.com/Documentation/R4400_Uman_book_Ed2.pdf.
System Design Using the Beast Microprocessor, Revision, 1.0 (1996).
MIPS R10000 Microprocessor User's Manual, Alpha Revision 2.0 (1995).
6.13 System Interface Bus encoding, copyright 1995, MIPS Technologies, Inc.—Jan. 96 (Internet footer date:Nov. 20, 1998).
MIPS R10000 Microprocessor User's Manual rev. 2.0, MIPS Technologies, Inc., Mountain View, CA, Sep. 19, 1996.

*Primary Examiner*—Paul R. Myers
*Assistant Examiner*—Raymond N Phan
(74) *Attorney, Agent, or Firm*—James W. Huffman

(57) ABSTRACT

A bus interface to a split transaction computing bus having separate address and data portions is provided. The bus interface contains separate address and data interfaces for initiating and tracking out-of-order transactions on either or both of the address or data portions of the computing bus. The bus interface includes split transaction tracking and control to establish transaction ID's for each transaction initiated by the bus interface, and to determine whether data appearing on the data portion of the computing bus is associated with one of its pending transactions. The bus interface also contains flow control logic to determine whether devices that are to be read from, or written to, by the bus interface, have resources (buffers) available to respond to the transactions. If the resources are available, the flow control logic allows the transactions to proceed, and adjusts its counters to reflect the use of the resources. If the resources are not available, the flow control logic causes the transactions to wait until the resources become available. Snoop control logic is also provided to insure coherency between multiple instances of data within devices attached to the split transaction bus. Data release logic drives a data release signal on the last cycle of a data transaction to reduce latency between sequential data transactions by one or more masters on the computing bus.

31 Claims, 10 Drawing Sheets

U.S. PATENT DOCUMENTS

| | | |
|---|---|---|
| 5,525,971 A | 6/1996 | Flynn |
| 5,553,310 A * | 9/1996 | Taylor et al. ................ 710/240 |
| 5,581,782 A | 12/1996 | Sarangdhar et al. ........ 395/800 |
| 5,615,404 A | 3/1997 | Knoll et al. ................. 395/882 |
| 5,621,897 A * | 4/1997 | Boury et al. ................. 710/116 |
| 5,696,976 A | 12/1997 | Nizar et al. ................. 395/739 |
| 5,751,975 A | 5/1998 | Gillespie et al. ............ 395/306 |
| 5,768,612 A | 6/1998 | Nelson ........................ 395/800 |
| 5,778,412 A | 7/1998 | Gafken .......................... 711/5 |
| 5,796,977 A | 8/1998 | Sarangdhar ................. 395/406 |
| 5,828,865 A | 10/1998 | Bell ............................. 395/500 |
| 5,911,052 A * | 6/1999 | Singhal et al. .............. 710/113 |
| 5,944,805 A * | 8/1999 | Ricks et al. ................. 710/107 |
| 5,961,621 A * | 10/1999 | Wu et al. .................... 710/107 |
| 6,021,451 A * | 2/2000 | Bell et al. .................... 710/305 |
| 6,173,349 B1 * | 1/2001 | Qureshi et al. .............. 710/110 |
| 6,266,778 B1 * | 7/2001 | Bell ............................. 713/400 |
| 6,304,932 B1 * | 10/2001 | Ziegler et al. .............. 710/112 |
| 6,356,972 B1 * | 3/2002 | Chin et al. ................... 710/310 |

\* cited by examiner

Figure 12 — Timing Diagram for Read Protocol

LOW LATENCY SYSTEM BUS INTERFACE FOR MULTI-MASTER PROCESSING ENVIRONMENTS

CROSS REFERENCE TO RELATED APPLICATIONS

This application claims the benefit of U.S. Provisional Application No. 60/121,807, filed Feb. 25, 1999 entitled "HIGH PERFORMANCE SYSTEM BUS INTERFACE".

FIELD OF THE INVENTION

This invention relates in general to the field of computer architecture, and more specifically to a bus interface for communicating between computing devices.

BACKGROUND OF THE INVENTION

A system bus in a computing system provides a communication channel between computing devices, such as microprocessors, and other devices such a memory, keyboard, monitor, video controllers, and sound generation devices, etc. The system bus typically includes data paths for memory addresses, data, and control information. In some instances, a microprocessor multiplexes (i.e., shares) address and data information over the same signal lines, albeit at different times. That is, a microprocessor sends address information out over the address/data pins during a first time period and later uses the same address/data pins to send or receive data. Alternatively, many microprocessors utilize separate signal lines for address and data information.

To better understand what a system bus is as well as the importance of bus interface standards, a general overview of the operation of a typical system bus is provided. Following that, a brief summary of modern system buses is given. Finally, an introduction to some of the needs that are not yet addressed by modern system buses is presented.

In operation, a microprocessor communicates with memory when it needs to fetch an instruction. During execution of that instruction, the microprocessor might be required to read data from memory, or from another external device such as an input/output (I/O) port. And, upon completion of the instruction, the microprocessor might be required to write data to memory, or to another external device. A typical scenario for accessing the memory to obtain the instruction and the data would be similar to the following:

1. The microprocessor presents a memory address for an instruction on the address lines of the system bus, and provides control information on the control lines of the system bus to indicate that the operation is a read.
2. In response to the address and control information being placed on the system bus, the memory places the instruction on the data lines of the system bus, which are then read by the microprocessor. The data is typically placed on the data lines N cycles after the address information has been placed on the address lines, where N is a positive integer and varies depending on the speed of the memory.
3. During execution of the instruction, if data is required, a memory address for the data is placed on the address lines of the system bus, and control information is placed on the control lines of the system bus to indicate a read.
4. Again, the memory places data corresponding to the memory address on the data lines of the system bus.
5. If the instruction needs to write to memory, the memory address for the write is placed on the address lines of the system bus, and control information is placed on the control lines to indicate a write.
6. N cycles after the memory address is presented, the data to be written is placed by the microprocessor on the data lines of the system bus. The memory uses the memory address presented in step 5, and places the data on the data lines into memory at that address.

One skilled in the art will appreciate from the above that the system bus provides the necessary physical interface between a computing device, and other devices that are external to it. The physical interface for a given system bus is typically defined in terms of the number of signal lines allocated to address, data, and control information, as well as the electrical characteristics of each of the signal lines. That is, typical system buses may provide anywhere from 20 address lines (for accessing up to 1 million different memory addresses), up to 45 address lines (for accessing up to 3.5 trillion different memory addresses). In addition, the size of the data portion of the system bus may vary from 8-bits in width, up to 128 bits in width. One skilled in the art will also appreciate that the wider the data width, the more information can be transferred at the same time.

From an electrical standpoint, system buses typically operate in the range of 0 volts to 5 volts, although other ranges are possible. Furthermore, particular bus interfaces define for each signal line on the bus, what logical state is meant for a particular voltage level. That is, the bus interface defines whether a logical 1 is provided by a voltage level of 5 volts, 0 volts (active low), or something else.

A system bus interface also provides the protocol necessary for communicating between devices. That is, the protocol defines when address, data, and control signals must appear on the system bus, in relation to each other. For example, in the illustration presented above, address information appears in parallel with control information. At some time later, data information is presented by the microprocessor, or is provided by memory.

A system bus protocol may also define how long signals must appear on the system bus. For example, a system bus protocol might require that address information appear on the bus for at least 2 clock cycles. And, the protocol might require that data must appear on the bus later than 2 cycles after the address information is removed. One skilled in the art will appreciate that such protocol definitions are specific to particular types of system uses.

With the above general background on system buses, a brief overview will now be provided for modern system bus interfaces.

The most common system bus interface in the world today is the Industry Standard Architecture (ISA) bus. In 1984, with the introduction of the Intel 80286 microprocessor, a new bus was required that could utilize the full 16-bit data bus of that processor. IBM decided to develop a new bus interface that could accept the data width of the 80286, and allow them to add more address and control signals to the previously designed PC bus. However, to allow the bus to remain backward compatible with devices designed for the PC bus, comprises were made. The resultant ISA bus was therefore something of a hybrid, offering advantages of increased speed (8 megahertz), increased data lines (16-bit), and increased address lines (24-bit), as well as additional interrupt and control lines, while at the same time separating the additional lines on a supplementary connector. This allowed legacy expansion cards with 8-bit data interface to be used, while adding additional data and address pins on the supplementary connector. The result was an 8-MHz bus clock, with a 16-bit data path, and 24 address lines to address 16 megabytes of memory. However, the number of I/O ports was still limited to 1,024 due to compatibility concerns with PC bus expansion boards.

As processor speeds increased, Intel separated the processor from the ISA bus to allow faster communication between the processor and memory, while still providing communication with slower ISA devices. The processor bus that is presently offered is referred to as either the host bus, or the Pentium bus. A typical implementation of the Pentium bus provides address, data and control signals between a processor and a memory controller, and operates at approximately 100 MHz. Also attached to this host bus is a chip, or chip-set that provides an interface between the host bus, and slower buses such as PCI and ISA. For a more thorough discussion of various PC bus architectures, the reader is directed to http://www.pcguide.com/ref/mbsys/buses/index.htm.

In each of the above-mentioned buses, the protocol associated with performing a read or write is essentially the same. That is, a processor first places address and control information on the host bus. At some later time, data is presented on the data lines of the bus, either by the processor (if the transaction is a write), or by memory (if the transaction is a read). In environments where there is only 1 device capable of initiating bus activity (a uni-master environment), such a protocol is generally sufficient. However, in environments where multiple processors compete for access to shared devices, arbitration is needed to assign time on the bus to the multiple processors.

For example, if there are two processors on a host bus, both competing for access to memory, typical systems provide an arbitration protocol between the devices to establish which one has the right to begin. On the Pentium bus, a processor requests access to the bus by asserting a "bus request" signal. If the processor receives a "grant" signal, then it begins a transaction by placing address and control information on the bus. When it receives (or writes) data on the bus, it relinquishes control of the bus to the next processor. If another processor required access to the bus during the transaction, it would have to wait until the entire transaction (including the address and data portions of the transaction) completed. In many situations, it is undesirable to deny a processor access to a bus pending completion of an entire transaction by another processor.

One solution to this problem has been to separate the address and data bus portions of the system bus, and to provide separate arbitration for gaining access to each of the buses. For example, rather than requesting access (or master) of the system bus, a first processor may request access to the address bus. If the address bus is available, the first processor can present address information on the address lines, even though a second processor is bus master of the data bus. Access to the data bus by the first processor operates in a similar fashion.

Thus, by separating arbitration for accessing the address bus from that of the data bus, multiple masters are allowed to utilize portions of the system bus simultaneously. An example of an environment that provides for such split address and data buses is the system bus for the PowerPC 603, manufactured by Motorola.

One skilled in the art should appreciate that when the address and data portions of a bus are separate, and are shared by multiple bus masters, a system must be developed for associating a data transaction with an address transaction. That is, if the address and data buses are truly separate, data may appear on the data bus many clock cycles after the address information was presented. In fact, in buses having split transactions, it is possible for two or more masters to present address information on the address bus long before data appears in response to the first address. In such an environment, it is essential to associate data on the data bus with either its associated address, or with a particular transaction.

In one environment, a transaction ID has been developed to tag all requests with a particular ID. When any data is presented on the data bus, the ID associated with the transaction is also placed on the data bus. This allows any processor on the bus to know whether the data being presented is associated with one of its outstanding transactions, and if so, which one. An example of using transaction ID's to track multiple transactions in a split address/data bus environment is the R10000 manufactured by MIPS Technologies.

The above provides a general understanding of the progression of system buses, from multiplexed address/data lines in a single master environment, to split transactions in a multi-master environment. However, what has not been presented, and is heretofore unknown, is a bus interface that allows multiple transactions from multiple bus masters to be pipelined over separate address and data buses.

Therefore, what is needed is a system bus interface that prescribes a uniform protocol for allowing computing systems to be designed, whether they be single master or multi-master, that takes advantage of pipelined split transactions on separate address and data buses.

Moreover, what is needed is a system bus interface that allows master devices to communicate with external devices that have different interfacing capabilities. For example, older external devices may have a data bus width of just 16-bits. Newer devices may have a data bus width of 64-bits. Furthermore, each device may be capable of sending or receiving data in burst mode (described further below in the Detailed Description), but may have different buffer capacities. Therefore what is needed is a system bus interface that allows each master to configure transactions for each type of external device, within a split transaction environment.

In addition, what is needed, is a system bus interface that provides for coherent data tracking within a multi-master environment, when split transactions are performed across separate address and data buses.

And, what is needed is a system bus interface that reduces latencies typically associated with changing bus masters, on either or both of the address or data buses.

SUMMARY

The present invention provides an innovative computer bus and bus interface that separates the address and data portions of transactions on a split transaction bus. By separating the address and data portions of a transaction, and presenting them on separate buses, multiple transactions, by either a single master, or multiple masters, can exist concurrently, without requiring that a first transaction be completed before beginning a second transaction. Such separation of transactions on a split transaction bus also allows for out-of-order completion of transactions.

In an embodiment of the present invention, a bus interface for a computing environment includes split transaction tracking and control, and flow control logic. The split transaction tracking and control establishes transaction ID's for transactions to be presented on a computing bus that has separate address and data buses where the transactions have split address and data portions. The transaction ID's have device ID's and transaction tags for uniquely identifying all pending transactions on the computing bus. The transaction ID's are presented on the computing bus commensurate with presentation of an address. Devices responding with data provide the associated transaction ID along with the data. The flow control logic determines whether devices that are being read from, or written to, by transactions, have adequate resources (buffers) to respond to the transactions. If the flow control logic determines that adequate resources are available, the transactions are presented to the computing bus. If the flow control logic determines that adequate resources are not available, the transactions are held until the resources become available. By providing such flow control, there is no need to retry any transactions resulting from inadequate resources.

One aspect of the present invention incorporates snoop control logic, and/or snoop management into devices on the computing bus. The snoop control logic, along with snoop management, insures that data coherency is maintained across multiple devices having instances of data, within the out-of-order, split transaction environment.

Another aspect of the present invention incorporates a data release mechanism. The data release mechanism is present within every master on the computing bus. It drives a data release signal during the last cycle of a data portion of a transaction to alert the next bus master that it can begin driving data. Tracking of data portions of transactions by the data release mechanism, and driving of the data release during the last cycle of a data transaction reduces the latency associated with sequential data operations.

In another aspect, the present invention provides a computer program product including a computer useable medium. Within the medium are a first computer readable program code and a second computer readable program code. The first code provides split transaction tracking and control to establish transaction ID's for transactions to be presented on a computing bus having address and data buses. The second code provides flow control logic to determine whether devices being read from, or written to, by the transactions, have buffers currently available to respond to the transactions.

Other features and advantages of the present invention will become apparent upon study of the remaining portions of the specification and drawings.

DETAILED DESCRIPTION

The above background provided an overview of system buses, and described a few of the problems in contemporary bus interfaces. The discussion below will provide a more detailed overview of a related art system bus, in FIGS. 1 and 2, so that the reader will better understand the novel features of the present invention described with reference to FIGS. 3–13.

Figure 1:
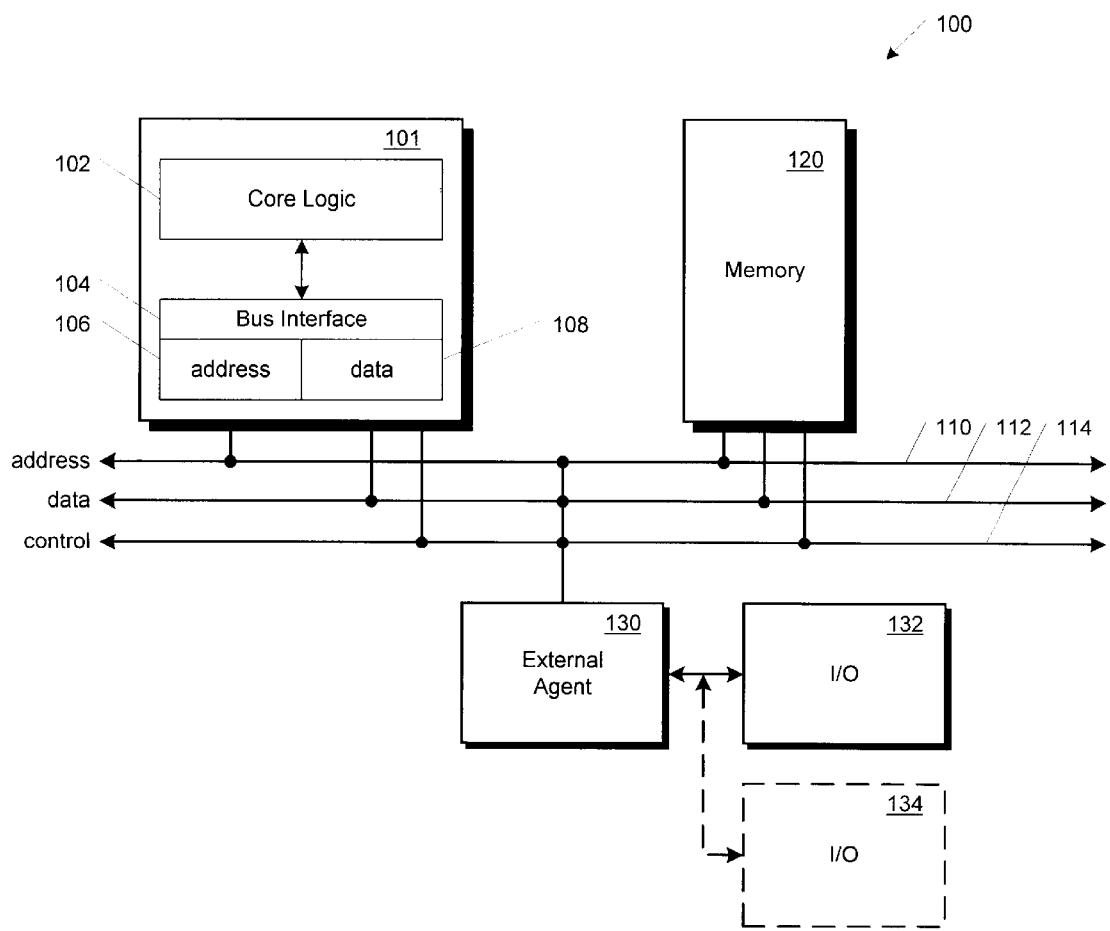
FIG. 1 is a block diagram of a related art computer network illustrating a processor connected through a bus interface to memory, and other external devices.

Referring to FIG. 1, a block diagram 100 of a related art computer system is shown. The computer system 100 includes a microprocessor 101 coupled to a memory 120 via a system bus having separate address lines 110, data lines 112, and control lines 114. Also coupled to the system bus is an external agent 130 connected to I/O devices 132, 134. The external agent 130 is what is commonly referred to as the "chip-set", providing a memory controller for the system bus, and an interface between the system bus, and downstream buses on which the I/O devices 132, 134 reside.

Within the microprocessor 101 is a bus interface 104 with separate address 106 and data 108 portions, for interfacing the microprocessor 101 to the address and data lines 110, 112 of the system bus. The bus interface 104 is coupled to core logic 102 for executing instructions retrieved by the microprocessor 101.

In operation, when the microprocessor 101 wishes to communicate with an external device, such as the memory 120, or the I/O 132, the bus interface 104 is required to perform a bus cycle using the address, data, and control lines 110–114. During a bus cycle, the microprocessor 101 places an address corresponding to the target memory (or I/O) address on the address lines 110. In addition, the microprocessor 101 indicates the type of bus cycle it is initiating by placing a pattern on the control lines 114. Exemplary bus cycle types include reads and writes, either to memory or I/O. If the bus cycle type is a read, then N cycles after the memory 120 sees the target address on the address lines 110, and notices the bus cycle type from the control lines 114, the memory 120 will place the data stored at the target address on the data lines 112. The data portion 108 of the bus interface 104 will see the data on the data lines 112 and will latch the data for use by the core logic 102.

Figure 2:
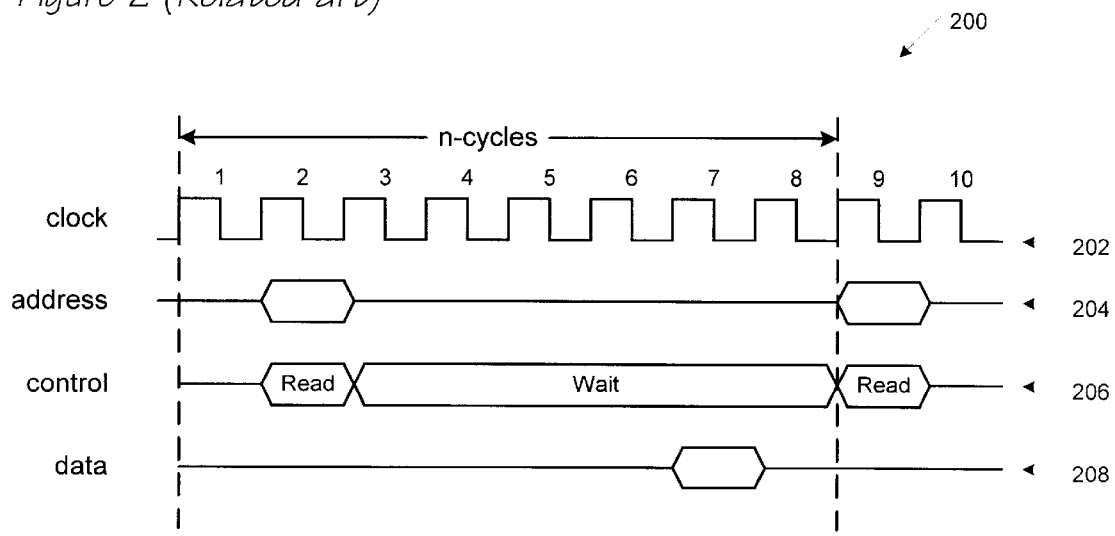
FIG. 2 is related art timing diagram illustrating a memory read cycle through the bus interface of FIG. 1.

This is particularly illustrated in FIG. 2 to which attention is now directed. FIG. 2 provides a timing diagram 200 that illustrates a memory read bus cycle for the computing system 100 described above. A clock 202 is shown that is the clock for the system bus. Addresses on address lines 110 are shown as an address signal 204. Data on data lines 112 are shown as data signal 208. Control information on control lines 114 is shown as command signal 206.

In performing a memory read, the processor 101 asserts a target address signal 204 on address lines 110 during clock cycle 2. The processor 101 also asserts control signal 206 indicating a memory read operation on control lines 114 during clock cycle 2. The memory 120 recognizes the target address signal 204 and the control signal 206, and retrieves data from the target address. The memory 120 places the data on the data lines 112 during clock cycle 7. The data portion 108 of the bus interface 104 latches the data during clock cycle 7 for use by the processor 101.

What should be apparent from the timing diagram 200 is that 6 clock cycles have been required for the microprocessor 101 to retrieve data from the memory 120. Thus, from clock cycle 2 until clock cycle 8, the system bus is busy servicing the memory read operation for processor 101. If the processor 101 requires another memory read (or any other bus operation), it must wait until clock cycle 9 before it can begin. In addition, if a second processor (not shown) is attached to the system bus, it would also need to wait until the first memory read operation completes. One skilled in the art will appreciate that requiring a processing device in a computing environment to wait or stall execution pending access to the system bus, slows down the processing of the computing environment, and is highly undesirable. What will now be described with reference to FIGS. 3–13 is a bus interface directed at overcoming waits or stalls associated with the sharing of a system bus by one or more processing devices.

OVERVIEW OF THE PIN BUS

The discussion below describes novel aspects of the present invention as embodied within a product developed by MIPS Technologies, Inc., and called internally the PIN Bus. The interface to the PIN Bus is being developed within a microprocessor called the R9000.

The PIN Bus provides a synchronous interface to a de-multiplexed split transaction bus, having a 36-bit address bus, and either a 32-bit or a 64-bit data bus. The arbitration for the address and data buses are independent, with the arbiter being external to the processing devices attached to the bus. External interventions and invalidations are supported for coherent I/O. In addition, the PIN Bus is designed to support several different CPU clock to system bus ratios. Although the description below will illustrate a particular embodiment of the PIN Bus, one skilled in the art will appreciate that the novel aspects of the present invention are applicable to many different bus architectures, and should not be restricted to the particular embodiment described.

SPLIT TRANSACTIONS

The computing environment described above required the processor 101 to wait until the data portion of the bus cycle completed before it was allowed to issue another read request. To eliminate this wait, the bus interface of the present invention provides a split transaction bus. That is, the processor does not have to wait for a request to be completed before issuing a new request. Rather, the processor, on the address/control lines of the PIN bus, is allowed to make requests before the data portions associated with the requests complete. In addition, the processor receives and processes requests even when it is waiting on completion of prior requests. This is accomplished by separating the request and the reply portions of transactions. By de-coupling the request portion of a transaction, from the reply portion of the transaction, latencies typically associated with waiting on the reply portion to complete are eliminated.

However, since multiple requests can be pending on the PIN bus at any one time, a means is required to identify data replies back to their corresponding requests, if out-of-order returns are to be permitted. To satisfy this requirement a processor tags each request that is made on the PIN bus when it issues. When a data response is ready, an external device sends the tag back to the requesting processor with the data. For Write requests, the writing processor sends the written data with the same tag it used when it issued the Write control. Furthermore if multiple processing devices are placed on the PIN bus, a portion of the tag is used to identify the requesting device.

Figure 3:
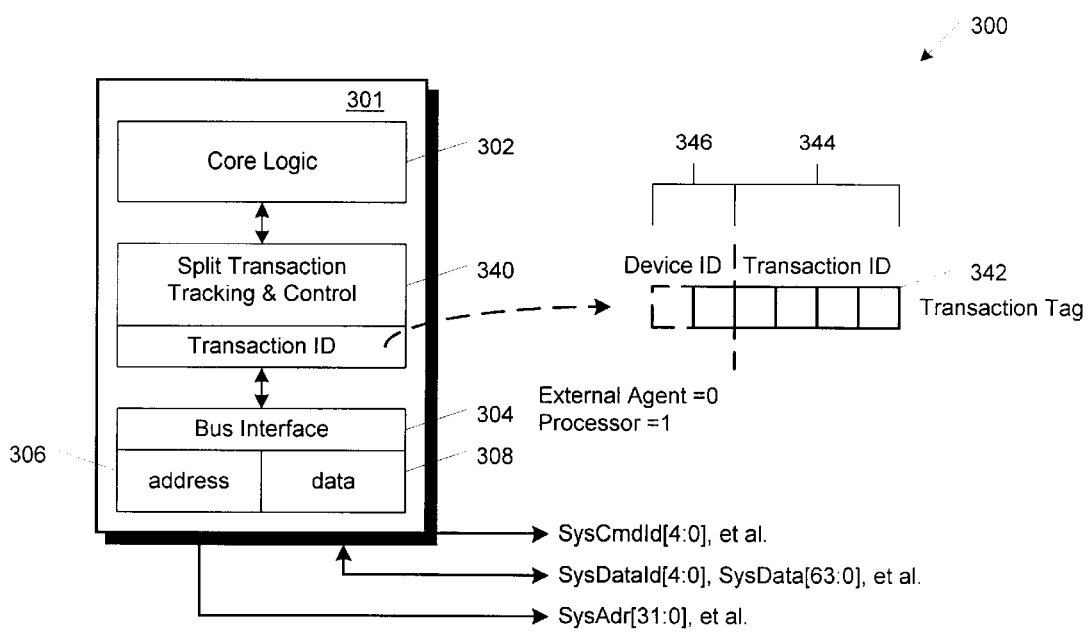
FIG. 3 is a block diagram of a microprocessor according to the present invention, particularly illustrating split transaction control and transaction ID's.

Referring to FIG. 3, a block diagram 300 is provided of a microprocessor 301 incorporating aspects of the present invention. Elements similar to those described in FIG. 1 above are shown with the same reference numbers, the hundreds digit being replaced with a 3. Additionally, the processor 301 includes split transaction tracking & control 340 coupled between the core logic 302 and the bus interface 304. Within the split transaction logic 340 is at least one transaction tag buffer 342. The tag buffer 342 provides temporary storage for transaction tags. In one embodiment, the transaction tags are 5-bits in width, for storing a 4-bit transaction ID 344 and a 1-bit device ID 346. Alternatively, the device ID 346 may be two or more bits. By using a 4-bit transaction ID 344, as many as 16 outstanding requests may exist on the PIN bus.

In operation, as each request is made by the processor 301, a target address is placed on address pins SysAdr[35:0]. In addition, as part of the request, the split transaction tracking and control 340 provides a transaction ID that is associated with the request and stores the transaction ID in the transaction tag buffer 342. The transaction ID is then placed on the ID control pins SysCmdId[4:0] (for a 5-bit transaction tag). In one embodiment, the split transaction tracking & control 340 resets the transaction tag to 0 upon reset, and increments the tag by 1 for each transaction 0–15. When the transaction ID 344 equals 15 (1111 binary), the tag rolls back around to 0.

When a reply is presented on the data pins of the PIN bus, SysData[63:0], the transaction ID associated with the request is placed on the SysDataId[4:0] lines of the PIN bus. Thus, the device replying to the request must be designed to provide the transaction ID to the PIN bus along with the data. To better understand how splitting the request and reply portions of a bus cycle reduces the wait described above, attention is directed to FIG. 4.

Figure 4:
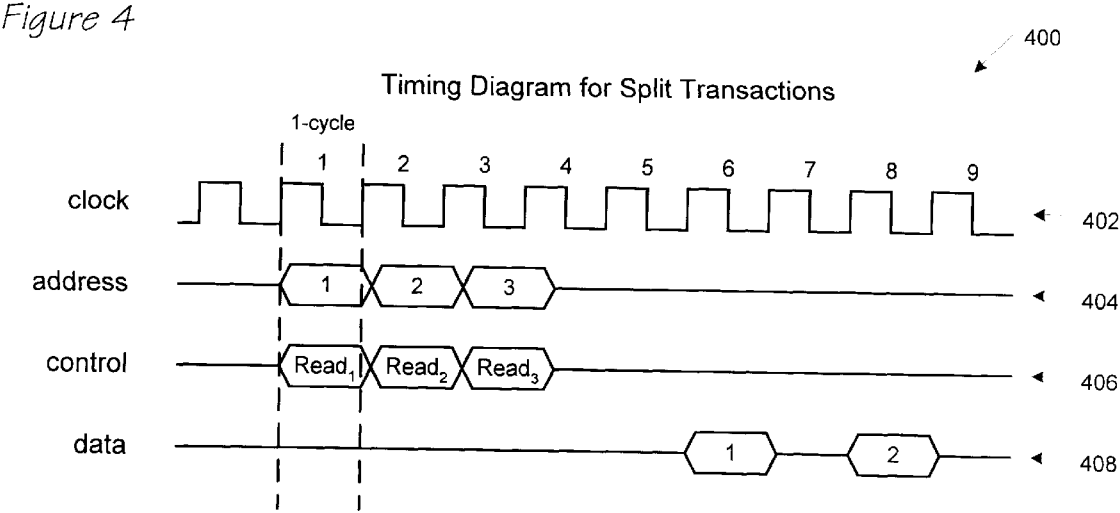
FIG. 4 is a timing diagram illustrating a memory read cycle through the bus interface of FIG. 3.

In FIG. 4, a timing diagram 400 is provided illustrating split transaction requests/replies. During clock cycle 1, request 1 is placed on the control lines 406 of the PIN bus to indicate a read. In addition, the split transaction tracking & control 340 places a transaction ID of 1, for example, on the SysCmdId[4:0] pins of the PIN bus. At the same time, the address portion 306 of the bus interface 304 places the target address associated with the request on the address lines 404 of the PIN bus. At the end of clock cycle 1, the address and control lines 404, 406 of the PIN bus are free to perform another transaction. This is true even though the reply associated with request 1 has not completed. Thus, in comparison with FIG. 2, the processor does not have to wait 6–8 cycles before beginning another request. Rather, the processor 301 can immediately make another request, if needed.

As shown in FIG. 4, the processor 301 makes 3 back to back requests. Beginning in clock cycle 2, the processor 301 issues request 2 on the control lines 406 of the PIN bus. In addition, the split transaction tracking & control 340 provides a transaction ID of 2 to the bus interface, which is presented on the SysCmdId[4:0] pins of the PIN bus. At the end of clock cycle 2, the address and control lines 404, 406 are free to perform another request.

So, in clock cycle 3, the processor 301 issues request 3 on the control lines 406 of the PIN bus. The split transaction and control 340 provides a transaction ID of 3 to be presented on the SysCmdId[4:0] pins of the PIN bus. The target address associated with request 3 is also presented on the address lines 404. At the end of clock cycle 3, the address and control lines 404, 406 are free to perform another transaction.

During clock cycle 6, data associated with request 1 is placed on the data lines 408 of the PIN bus. The data is being provided by memory external to the processor 301, or by any other device capable of responding to a read request. In addition, the transaction ID associated with request 1 is placed on the SysDataId[4:0] pins of the PIN bus to identify the data with its associated transaction. At this point, the bus interface 304 of the processor 301 detects the data, and its associated transaction ID. Since the transaction ID indicates the device ID 346 that initiated the request, the processor 301 knows that it is the requester. So, the processor 301 latches the data in the data portion 308 of the bus interface 304. If another processor had requested the data, the device ID 346 portion of the transaction tag would indicate this, and the processor 301 would not latch the data. The transaction tag is then provided to the split transaction & control 340. The split transaction & control 340 is then responsible for associating the data according to the target address of request 1. At the end of clock cycle 6, the data lines 408 are free to be used by another device on the PIN bus.

During clock cycle 8, data associated with request 2 is placed on the data lines 408 of the PIN bus. Again, along with the data, its associated transaction tag is placed on the SysDataId[4:0] pins of the PIN bus. The processor recognizes that it was the requester of the data, and latches the data in the data portion 308 of the bus interface 304. The split transaction & control 340 is then responsible for associating the data according to the target address of request 2.

What has been described above with respect to FIGS. 3 and 4 is a means for separating the request and reply portions of a bus cycle to allow multiple requests to be made, without regard to latencies associated with replies. In the embodiment shown, all of the concurrent requests were memory read requests (as opposed to memory writes, or I/O reads/writes). However, one skilled in the art will appreciate that the nature of the request does not affect the advantages of the split transaction bus. In addition, what has been described are concurrent requests made by a single processor 301. It should also be appreciated that multiple processors can exist on the PIN bus, identifying themselves with each transaction using the device ID 346 portion of the transaction tag.

Credit/Debit Flow Control

In a split transaction environment such as the one described above, since multiple requests may be submitted to a device before it responds, it is possible that the recipient of the requests can become overloaded. That is, a receiving (or slave) device of transaction requests may not have the buffer space to deal with multiple transactions, or at least the number of transactions that are currently pending. Therefore, to insure that requests are not placed on the PIN bus that cannot be replied to by slave devices, a flow control mechanism has been incorporated into the bus interface of the present invention. This is particularly described below with reference to FIGS. 5 and 6.

Figure 5:
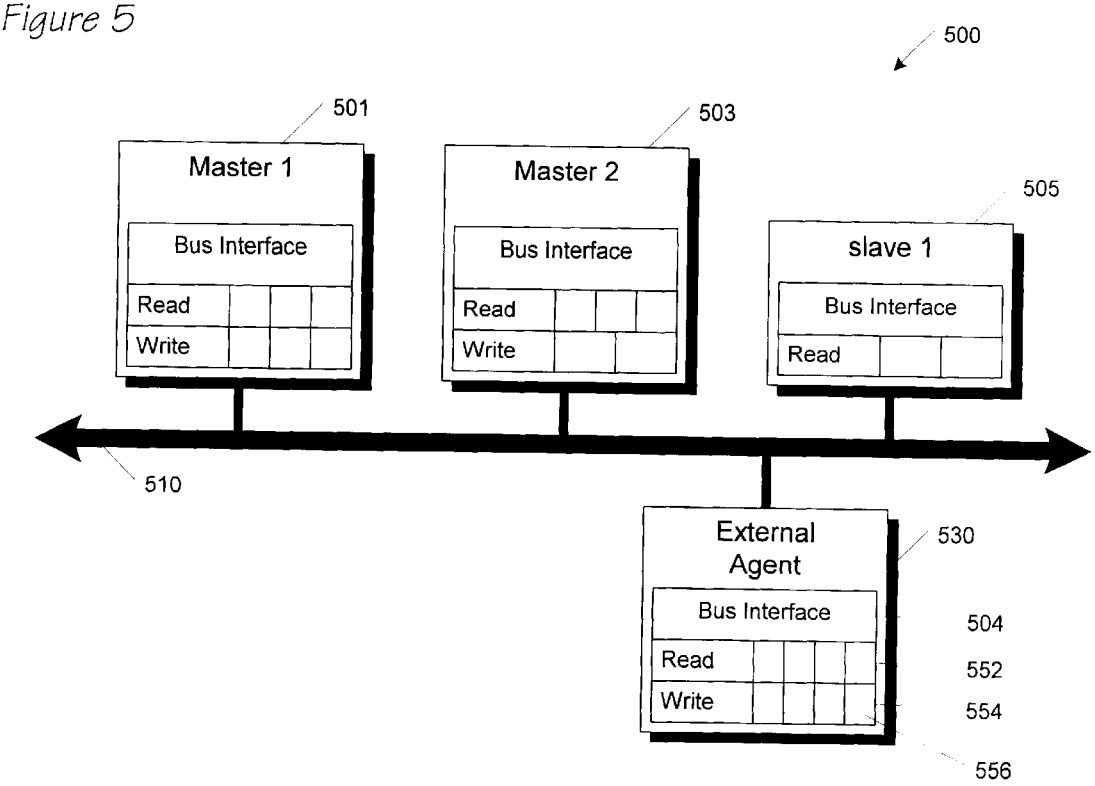
FIG. 5 is a block diagram of a multi-master processor architecture that includes differing read/write queue structures according to the present invention.

Referring to FIG. 5, a block diagram of a multi-master computing system 500 is shown. The system 500 includes microprocessors 501, 503, each of which may be master of the system bus 510. In addition, coupled to the system bus 510 are a slave device 505, and an external agent 530. In one embodiment, the external agent 530 provides an interface between the system bus 510 and downstream buses, and controls arbitration over the system bus 510. While not specifically shown, it should be understood that the system bus 510 is a split transaction bus such as that described above.

Within each of the devices 501, 503, 505, and 530 is a bus interface 504 that controls the interaction between the devices and the system bus 510. In addition, each of the bus interfaces 504 may contain a read buffer portion 552, and a write buffer portion 554, each portion containing a plurality of individual buffers 556. The buffers 556 provide temporary storage for data coming into a device (read portion 552) or data being written out of a device (write portion 554).

What is particularly illustrated in the system 500 is that each of the devices 501, 503, 505, and 530 have different sizes and configurations of read/write buffers. For example, microprocessor 501 contains 3 read buffers and 3 write buffers. Microprocessor 503 contains 3 read buffers and 2 write buffers. Slave 505 contains 2 read buffers and 0 write buffers. External Agent 530 contains 4 read buffers and 4 write buffers. In addition, while not shown, the size of the buffers in each of the devices may be different. That is, a read buffer in microprocessor 501 may be 64-bits wide. However, a read buffer in slave 505 may be only 32-bits wide.

As mentioned above, in a split transaction bus, it is important that a requesting device not place more requests on the system bus 510 than a replying device can handle. Therefore, to prevent a requesting device from overloading the capacity of a replying device, the present invention incorporates a credit/debit flow control mechanism into each requesting device. This is particularly illustrated in FIG. 6 to which attention is now directed.

Figure 6:
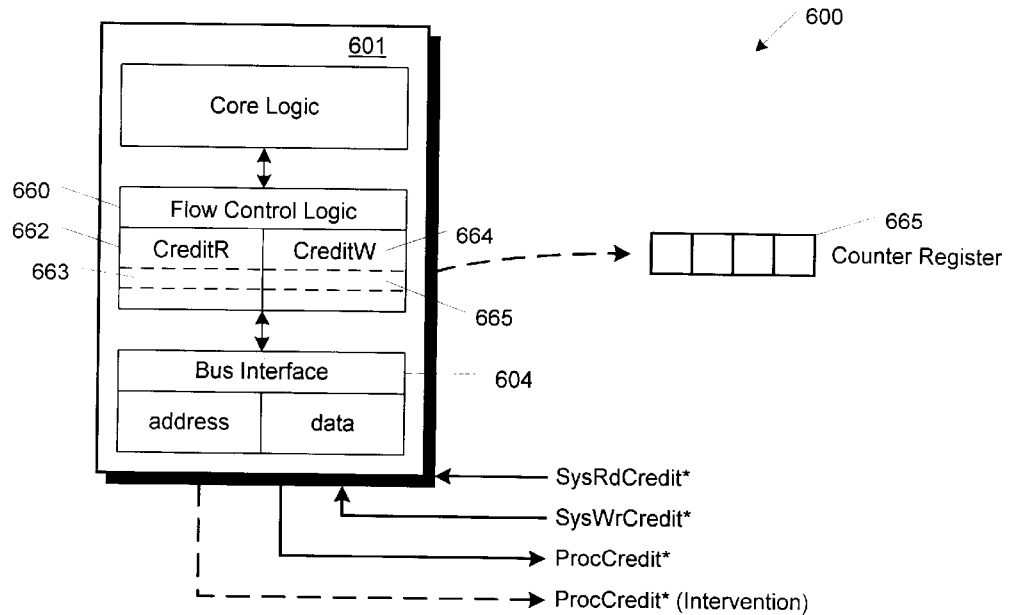
FIG. 6 is a block diagram of a microprocessor according to the present invention that contains credit based flow control counters for tracking the different queue structures illustrated in FIG. 5.

In FIG. 6, a block diagram 600 of a microprocessor 601 is shown. The microprocessor 601 is similar to that shown in FIG. 3 with like elements having like references, the hundreds digit being replaced with a 6. In addition, the microprocessor 601 includes flow control logic 660 coupled to the bus interface 604. Within the flow control logic 660 are a credit read portion 662 and a write portion 664. The credit read portion 662 contains a plurality of credit read counter registers 663. The credit write portion 664 contains a plurality of credit write counter registers 665. In one embodiment, the counter registers 663, 665 are 4-bit counters, capable of tracking 16 different read/write buffers per external device. The processor 601 is shown coupled to the following control signals: SysRdCredit*; SysWrCredit*; ProcCredit*. These signals will be described further below with reference to FIG. 7.

Furthermore, while not specifically shown, a counter register is provided within the flow control logic 660 of each requesting device 501, 503, 530, for tracking the number of requests made to each device that can reply, within a given system. For example, in a system that has only 2 master/slave devices, the flow control logic 660 within each master/slave device will have 1 credit read counter register 663, and 1 credit write counter register 665. However, in a system that has more than 2 master/slave devices, or additional slave devices, the flow control logic 660 within each master/slave device will have additional credit read counter registers 663, and credit write counter registers 665. Of course, this illustration is exemplary only. One should be understood is that the flow control logic 660 within each requesting device must have means for tracking the number of read/write buffers available in each replying device.

In operation, when the computing system 500 powers on, a protocol is established between the flow control logic 660 within each master, and each replying device, to allow the replying devices to communicate to the masters, their read/write buffer configuration. In one embodiment, each replying device presents a signal on its SysRdCredit and SysWrCredit lines that are connected to the master devices. Within a given time period, each time a replying device toggles either of the credit lines, its associated counter register in each master device is incremented. For example, if a slave device toggles line SysRdCredit 4 times, then the credit counter registers 663 in each master device will increment to 4. Use of the credit read/write counter registers by the masters is then used to control whether requests are made to the replying device, in the manner described below with reference to FIG. 7.

Figure 7:
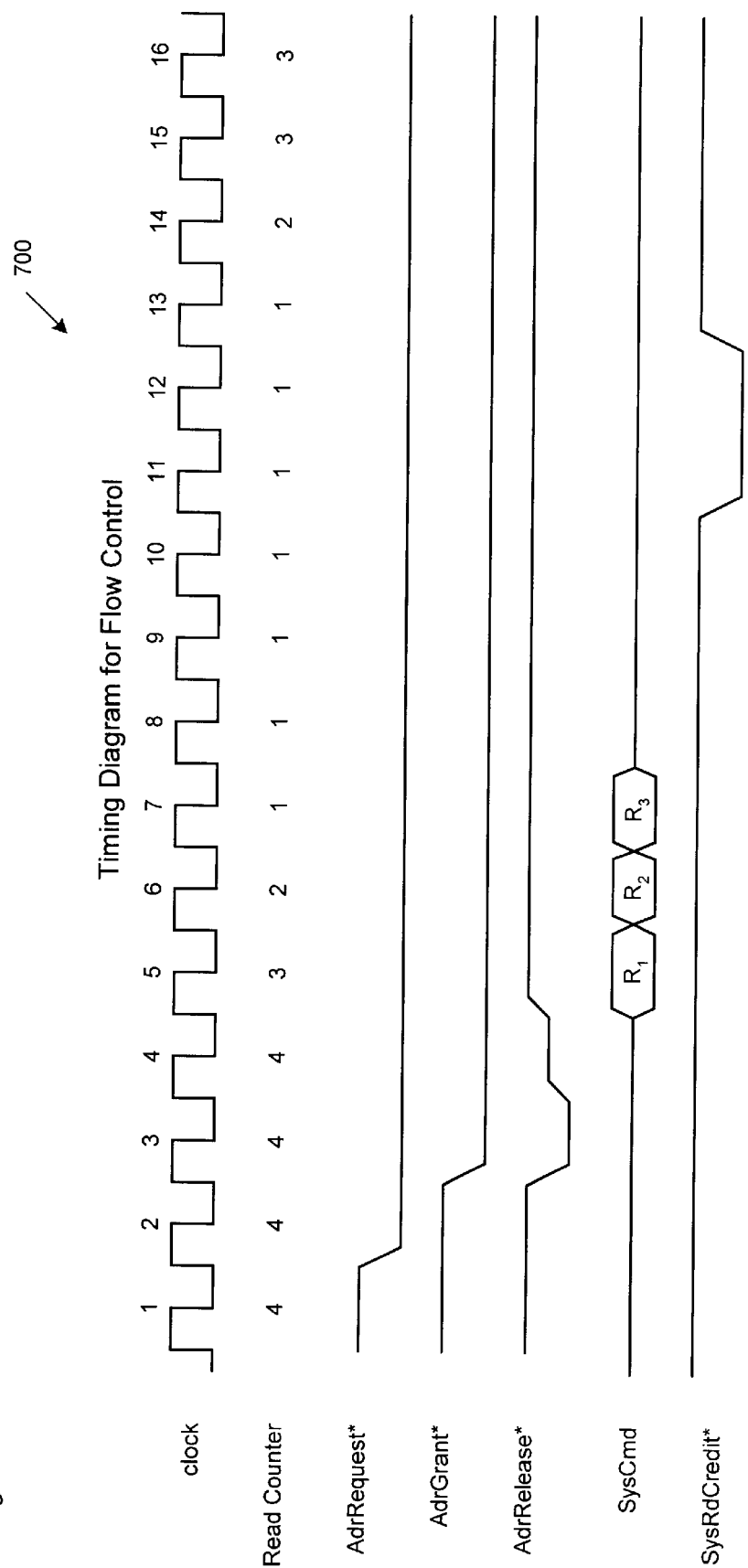
FIG. 7 is a timing diagram illustrating the credit based flow control mechanism of FIG. 6.

Referring now to FIG. 7, a timing diagram 700 is shown that illustrates the flow control mechanism of the present invention. The diagram 700 presents the following control signals: AdrRequest*, AdrRelease*, SysCmd, and SysRdCredit*. Each of these control signals are part of the PIN bus interface of the present invention. The signals associated with the address and data portions of the illustrated bus cycles have been removed for simplicity.

In addition, an EA Read count is shown below each clock cycle to illustrate the number of read buffers available within a replying device, as recorded in a credit read count register of the requesting master. As mentioned above, the credit read counter register was initialized by a replying device after power up.

During clock cycle 1, the credit read counter register that is associated with the device to which the request is directed, contains the number 4. This indicates that the slave device has 4 available read buffers. Therefore, before making the request for the address bus, the master knows that it can make up to 4 read requests of this slave device.

During clock cycle 2, a master asserts AdrRequest* to indicate that it wishes to become master of the address bus, and provide a request.

During clock cycle 3, the master receives an AdrGrant* signal from an external agent. As was mentioned briefly above, the external agent 530 arbitrates between master devices on the PIN bus. In addition, the external agent 530 provides an AdrRelease* signal to indicate to the master that it can begin driving the address bus. More information on the AdrRelease* signal will be provided below with reference to FIGS. 9 and 10.

In one embodiment, a master can begin driving the address bus 2 cycles after it receives grant and release. So, in clock cycle 5, the master presents a first read request on the control lines of the bus, indicated by $R_1$ on the SysCmd lines. While not shown, it should be appreciated that the target address for the read is presented on the address line at the same time. Also, when the master issues a read request, the flow control logic 660 within the master decrements the credit read counter register 663 associated with the target slave. In the present illustration, the counter is decremented from 4 to 3.

During clock cycle 6, since AdrGrant* is still being driven to the master, indicating that no other device requires access to the address lines of the PIN bus, the master can issue a second read request $R_2$ on the control lines of the bus. Since it requires more data from the replying device, it issues the request. In addition, the flow control logic 660 within the master decrements the credit read counter register 663 from 3 to 2.

During clock cycle 7, since AdrGrant* is still being driven to the master, and since the master still requires more data, the master issues a third read request R3 on the control lines of the bus. In addition, the flow control logic 660 within the master decrements the credit read counter register 663 from 2 to 1.

What has been described thus far is how a single master tracks the number of available read buffers for a single replying device. However, what should be appreciated is that if there are multiple masters attached to the pin bus, each of the masters must track the number of available buffers in the slave devices. While the master performing the request has advance notice of a request being made, and can decrement its counter commensurate with the request, other masters are required to see a request being made, and decrement their counters corresponding to the number of requests made. In one embodiment, master devices on the PIN bus require 2 clock cycles after seeing a request, to decrement their counters.

During clock cycle 11, the slave device to which the initial request was made drives the SysRdCredit* line to indicate that it has cleared one of its buffers that was being utilized by a previous request. The master 601 sees this line being driven at the start of clock cycle 12. In one embodiment, it takes the master 601 two cycles after seeing a SysRdCredit* to increment its credit read counter register from 1 to 2, which it does, as is illustrated in clock cycle 14. While not shown, it should be appreciated that all masters on the PIN bus will also increment their associated credit read counters after seeing SysRdCredit*.

During clock cycle 12, the slave device continues to drive SysRdCredit* indicating that it has cleared another one of its buffers that was utilized by a previous request. The master 601 sees this line being driven at the start of clock cycle 13. Thus, in clock cycle 15, it increments its credit read counter from 2 to 3. At the end of clock cycle 12, the slave device ceases driving SysRdCredit*.

During clock cycle 13, since the SysRdCredit* line is no longer being driven, no other credit read count registers are incremented.

At this point, what is important to understand, is that at any time, every master knows whether it can issue a request (whether a read or a write, to memory or I/O) to a particular device, knowing that the device is capable of responding. This is very important on a split transaction bus where requests and replies are separated, and where replies can be provided out of order. And, by tracking the number of free resources on a transaction by transaction basis, the need for retrying bus cycles is eliminated.

While not specifically illustrated in FIG. 7, it should be appreciated that the credit write counter register 665 works similarly to the credit read counter register 663, only for writes. Furthermore, the control signal SysWrCredit* is used by a slave device to indicate to the processor 601 that it has cleared a write buffer. Finally, since the processor 601 may contain read/write buffers that are used by another master, it can provide one or more ProcCredit* signals to indicate when its buffers are cleared.

COHERENCY

A bus interface that allows multiple masters to share memory and I/O resources, while utilizing caching techniques, and/or when allowing split transactions, must provide a means for insuring that data in a particular target address is the latest, or best data. That is, the bus interface must insure that all instances of a piece of data across multiple devices remain coherent. The coherency mechanism that has been provided by the present invention is described below with reference to FIG. 8 to which attention is now directed.

Figure 8:
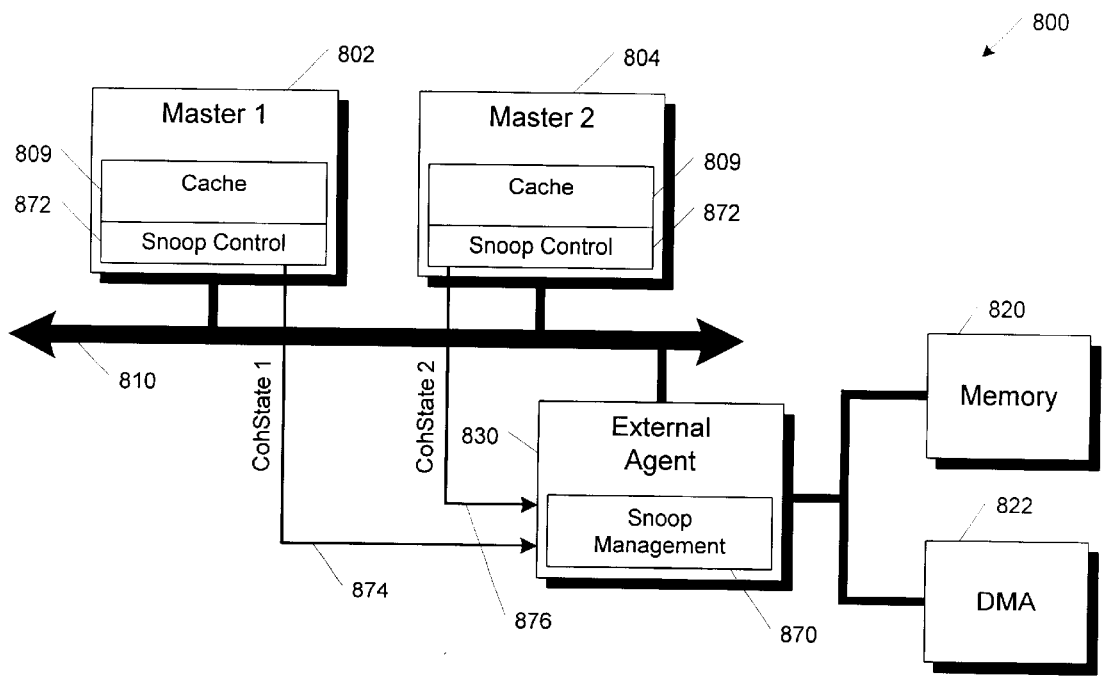
FIG. 8 is a block diagram of a multiple master architecture incorporating snoop control and snoop management across a split transaction bus, according to the present invention.

FIG. 8 provides a block diagram of a multi-master computer system 800. The system 800 contains master devices 802, 804 coupled to an external agent 830 via a system bus 810. Also shown coupled to the external agent 830 are a memory 820 and a direct memory access (DMA) controller 822. The DMA controller 822 may be coupled to another bus (e.g. SCSI), or to a hard disk, for example. Within each of the master devices 802, 804 are a cache 809, and snoop control 872. The snoop controls 872 are coupled to snoop management logic 870 within the external agent 830 via CohState1, CohState2 signals 874, 876, respectively.

Before describing the operation of the coherency mechanism of the present invention, a brief summary will be provided that illustrates the problem of coherency. Suppose that master 802 requests data from target address A in the memory 820 and places the data into its cache 809. Now, suppose that master 802 alters the data, and stores the altered data back into its cache 809, but does not write the data back into the memory 820. At this point, the data in the cache 809 and the memory 820 are different. Now suppose that master 804 requests data from the memory 820 at target address A. Since the data in memory 820 is not coherent with the data in cache 809 within master 802, master 804 will not get valid data, unless of course coherency means are provided.

The present invention provides hardware coherent I/O through Intervention and Invalidate requests that are provided to the External Agent 830 via signal lines 874, 876 by the masters 802, 804 respectively. An example of this follows.

If the DMA controller 822 wishes to transfer a block of data to the memory 820, it will indicate the address for the block transfer on its address bus. The snoop management 870 logic within the external agent 830 will see the address for the block transfer, and will determine whether the memory addresses within the block transfer pertain to memory addresses that may be cached in any of the masters 802, 804. If so, the external agent 830 will provide to the masters 802, 804 an Intervention request. The Intervention request indicates to the masters 802, 804 the memory address pertaining to the block transfer, as well as the need for the masters 802, 804 to perform a snoop operation. The snoop control 872 in the masters 802, 804 determine if their caches 809 contain a cache line with that memory address. If so, the snoop control 872 determines the state of the cache line.

In one embodiment, the states for the cache line include: Invalid, Clean and Dirty. An Invalid cache line is a cache line that does not contain the latest data, and therefore does not need to be provided to the memory 820. A clean cache line indicates that the data in the cache line is the same as that in the memory 820. If the snoop control 872 determines that the address is in the cache 809, and that the cache line is clean, it invalidates that cache line. A dirty cache line is a cache line that contains data that has been changed or modified since it was read from the memory 820. In this case, the data needs to be written back to the memory 820 before the DMA controller 822 is allowed to proceed.

Whether the masters 802, 804 contain the memory address within their caches 809, and whether the cache line is invalid, clean, or dirty, needs to be communicated to the snoop management 870 of the external agent 830. This is done via the CohState1 and CohState2 signals 874, 876 from each of the masters 802, 804. Until the snoop management 870 receives signals via the CohState1 874 and CohState2 876 lines from each of the masters 802, 804, the DMA controller 822 is not allowed to proceed. And, in the event that either of the snoop control 872 blocks within the masters 802, 804 indicate that a cache line is dirty, the external agent 830 performs a write back of the cache line to the memory 820 before allowing the DMA controller 822 to proceed. Once the snoop management 870 receives an indication from both masters 802, 804, and performs a write back (if necessary), the DMA controller 822 is allowed to proceed with a transfer.

Within the split transaction bus of the present invention, it is possible to have coherency conflicts arise from transactions that have begun, but have not yet completed. For example, an external request (e.g., from the DMA controller 822) may conflict with a processor request that has not yet been issued from either of the masters 802, 804 to the PIN Bus 810 (an internal conflict). In this instance, since the external agent 830 does not have any information about the processor request, the processor takes responsibility for resolving the conflicts. This is shown below.

| | INTERNAL CONFLICT RESOLUTION | |
|---|---|---|
| Processor Request | Conflicting External Request | Resolution |
| Block Read | Intervention Exclusive Invalidate | The processor allows the external request to go through and returns a state response of Invalid. Also, the processor stalls the read request, and does not issue it until after the state response is issued to the external agent |
| Block Write | Intervention Exclusive | The processor returns a DirtyExclusive state response, and then turns the write request into a DirtyExclusive data response. |
| | Invalidate | The processor returns a DirtyExclusive state response, and then cancels the write request |

It is also possible for conflicts to arise when a processor request has already been issued to the external agent 830, but has not yet been completed (an external conflict). In this instance, it is the responsibility of the external agent 830 to avoid these conflicts. External conflicts should not occur under normal circumstances, however, the processor will deal with them as shown below.

| | EXTERNAL CONFLICT RESOLUTION | |
|---|---|---|
| Processor Request | Conflicting External Request | Resolution |
| Block Read | Intervention Exclusive Invalidate | The processor returns a state of Invalid. The processor still expects the external agent to provide a data response for the outstanding request. |

-continued

EXTERNAL CONFLICT RESOLUTION

| Processor Request | Conflicting External Request | Resolution |
| --- | --- | --- |
| Block Write | Intervention Exclusive Invalidate | The processor completes the block write transaction before sending the state response. It then sends a state response of Invalid. |

DATA RELEASE TO REDUCE LATENCY

Figure 9:
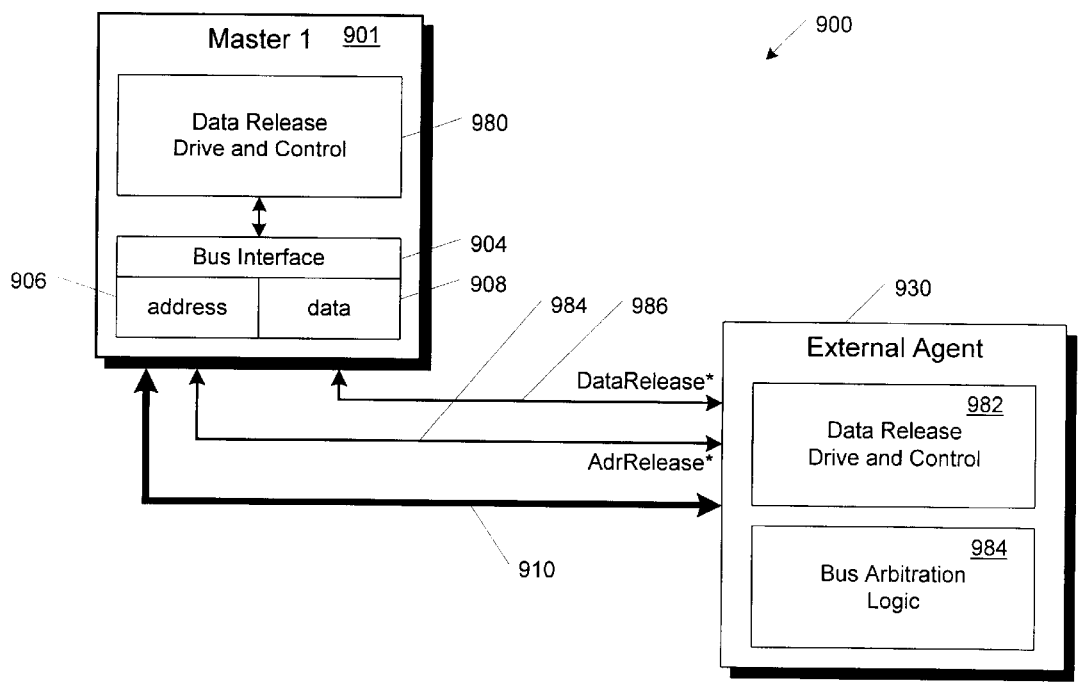
FIG. 9 is a block diagram of a data release mechanism according to the present invention.

Referring to FIG. 9, a block diagram 900 of a data release mechanism according to the present invention is shown. The purpose of the data release mechanism is to reduce the latency typically associated with ending a first data transaction, and beginning a second data transaction. This latency, along with the improved timing of the present invention will be illustrated below with reference to FIG. 10. However, a brief overview of the elements required to reduce the latency will first be described with reference to FIG. 9.

Diagram 900 includes a master processor 901 coupled to an external agent 930 via a system bus 910. Within the master 901 is a bus interface 904 having address and data portions 906, 908 respectively. Also within the master 901 is data release drive and control logic 980 that is coupled to the bus interface 904. The data release drive and control logic 980 communicates with the external agent via AdrRelease* and DataRelease* signal lines 984, 986, respectively. The External Agent 930 also contains data release drive and control logic 982, similar to that contained in the master 901. Furthermore, the external agent includes bus arbitration logic 984 for controlling which master has access of the address and data portions of the PIN bus. Operation of the data release drive and control logic 980 will now be described with reference to FIG. 10.

Figure 10:
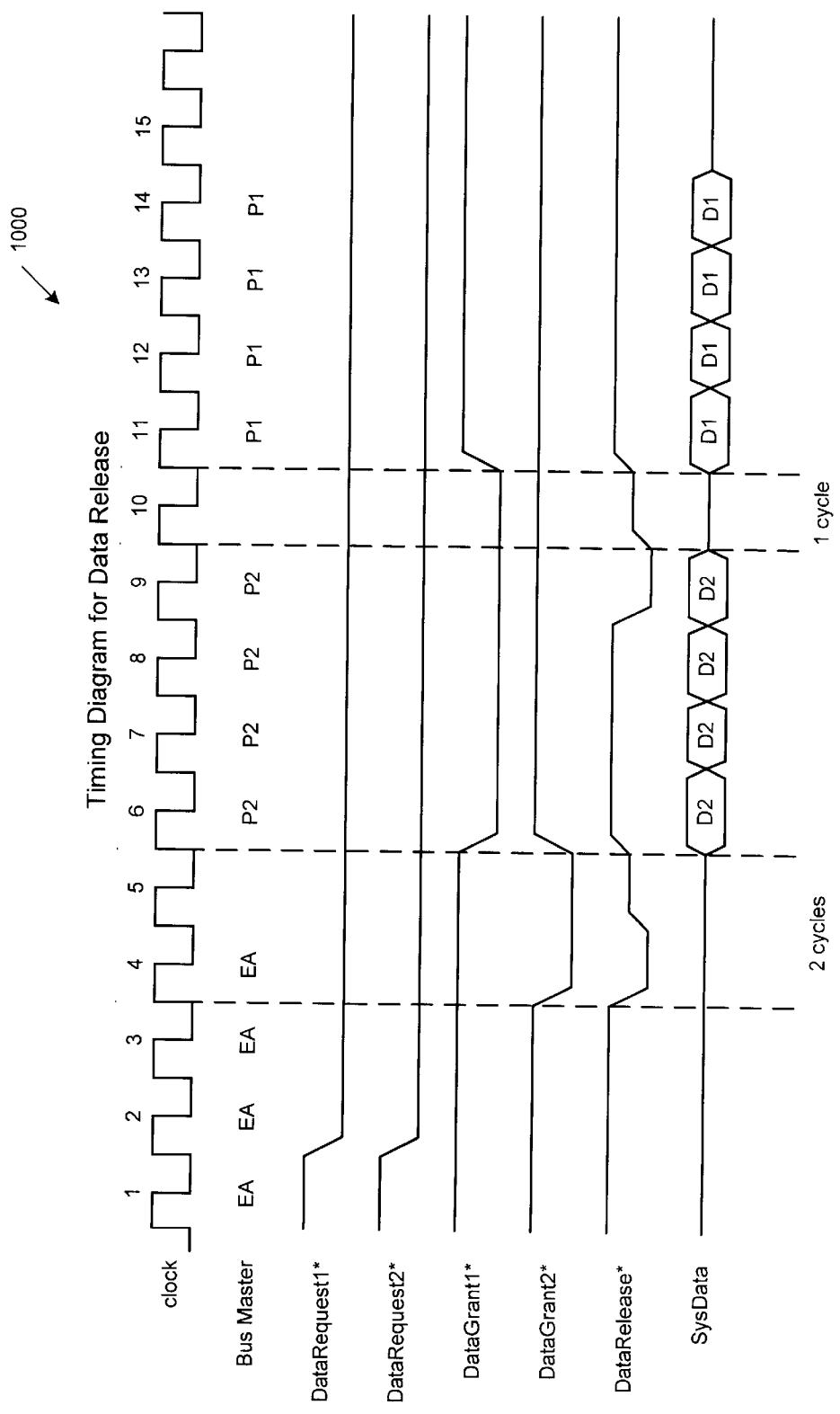
FIG. 10 is a timing diagram illustrating the data release mechanism of FIG. 9.

FIG. 10 provides a timing diagram 1000 that illustrates arbitration on the data portion of the PIN bus using the data release drive and control logic 980 according to the present invention.

During a second clock cycle, two master devices similar to the master 901 request access to the data portion of the PIN bus 910 by asserting DataRequest1* and DataRequest2*, respectively. At the time of the request, the external agent 930 is the bus master over the data bus. In one embodiment, there is a two-cycle latency between the time a master requests access to the data bus, and the time the external agent drives grant.

So, in clock cycle 4, the external agent 930 grants access to master 2 by driving DataGrant2*. In addition, since no other processor was master of the data bus at the time of the requests, the data release drive and control 982 of the external agent 930 drives DataRelease*. In one embodiment, there is a two-cycle latency between the time a master sees release, and the time it can drive the data bus. For example, even though DataRelease* is driven during clock 4, master 2 does not "see" DataRelease* until clock cycle 5. Master 2 then drives the data bus, after seeing DataGrant2*, and DataRelease*, at the beginning of clock cycle 6. Thus, from the time access to the data bus is granted to master 2 (clock cycle 4), to the time it begins driving data (clock cycle 6), there is a two-cycle latency. In the present illustration, master 2 drives data on the data bus for 4 clock cycles (6–9).

In typical split transaction buses, it is common to hold grant with the current bus master, until it completes its bus transaction. However, because of the above described two-cycle latency, the present invention allows the bus arbitration logic 984 in the external agent 930 to remove grant from a first master before it completes its transaction, and to assert grant to a second master. This is shown clock cycle 6 where the bus arbitration logic 984 de-asserts DataGrant2*, and asserts DataGrant1*.

At this point, master 2 is master of the data portion of the PIN bus for as many cycles as required (typically 2–12) to complete its current transaction. However, once it completes its current transaction, since DataGrant2* has been de-asserted, master 2 knows that it must relinquish control of the data bus. In addition, master 1, upon seeing assertion of DataGrant1* knows that it can begin driving data two-cycles after it sees DataRelease*. In one embodiment, the DataRelease* signal is driven by the Data Release Drive and Control logic of the current bus master. Thus, if the external agent 930 is the bus master, it is responsible for driving DataRelease*. If master 2 is the current bus master, it is responsible for driving DataRelease*.

The bus interface 904 of the current bus master (master 2) knows that it will complete its data transaction during clock cycle 9. Therefore, by coupling the data release drive and control 980 to the bus interface 904, the data release 980 is also aware that master 2 will complete its current data transaction during clock cycle 9. So, instead of waiting for master 2 to complete its data transaction, the data release drive and control 980 asserts DataRelease* during clock cycle 9. That is, the data release drive and control 980 asserts DataRelease* during the last cycle of a data transaction.

So, during clock cycle 10, master 1 sees DataRelease*. Since it has already been granted mastership of the data bus, it begins driving the data portion of the PIN bus during clock cycle 11. At this point it should be appreciated that although there is a 2-cycle latency between the time DataRelease* is driven, and the time master1 can begin driving the data portion of the bus, there is an effective latency between data transactions of only 1-cycle. This is because the data release drive and control 980 logic of the present invention allows a current bus master to drive DataRelease* during the last cycle of a transaction, rather than upon its completion.

What has been illustrated in FIGS. 9 & 10 is a mechanism to reduce bus access latency between competing masters on a data bus. One skilled in the art will appreciate that the data release drive and control logic 980 described above is also responsible for reducing bus access latency between competing masters on an address bus. This is performed via an AdrRelease* signal, and operates in a manner similar to that described above with respect to the data bus.

PIN BUS INTERFACE SIGNALS

Figure 11:
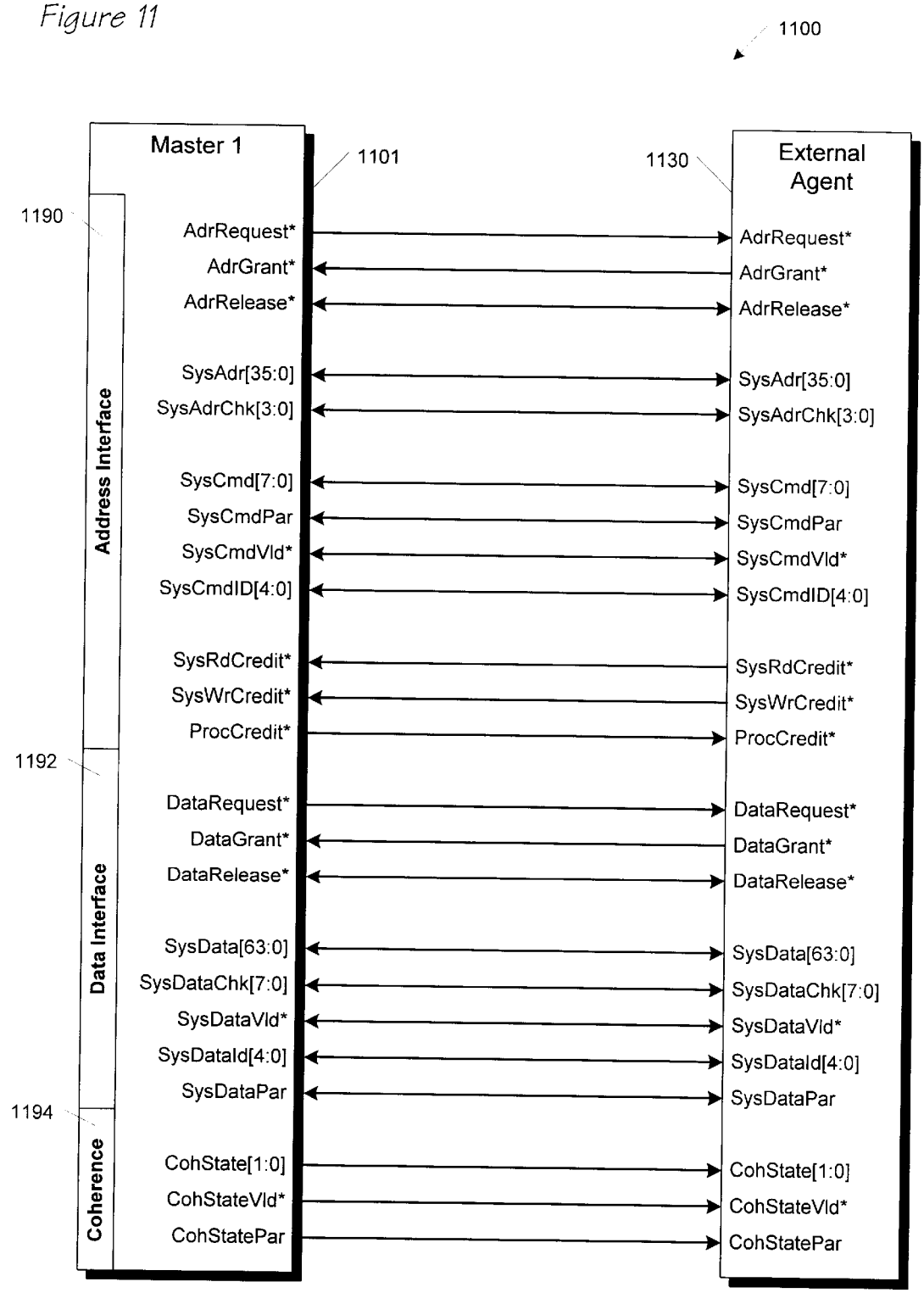
FIG. 11 is a block diagram illustrating the pin bus interface of the present invention.

Referring to FIG. 11, a block diagram 1100 is shown that illustrates Address, Data and Control signals between a Master 1 1101 microprocessor, and an External Agent 1130, according to the PIN bus of the present invention. This Figure shows: a 36-bit address bus SysAdr[35:0], along with corresponding check bits SysAdrChk[3:0]; a bi-directional 64-bit data bus SysData[63:0] with corresponding transaction identifier SysDataId[4:0], valid and check bits SysDataChk[7:0], SysDataVld*, SysDataPar; three address arbitration signals AdrRequest*, AdrGrant*, and AdrRelease*; three data arbitration signals DataRequest*, DataGrant*, and DataRelease*; three flow control signals SysRdCredit*, SysWrCredit*, and ProcCredit*; a bi-directional 8-bit command bus SysCmd[7:0], with corresponding transaction identifier SysCmdId[4:0], valid and parity bits SysCmdVld* and SysCmdPar; and a 2-bit coherence response bus CohState[1:0], with corresponding valid and parity signals CohStateVld* and CohStatePar.

The PIN bus interface shown in 1100 is partitioned into three sub-interfaces, each of which operates independently from the others. The PIN bus interface consists of separately controlled Address 1190, Data 1192 and Coherence 1194 interfaces. The address and the data interfaces 1190, 1192 are independent, and each can be in either a master or slave state at any time regardless of the state of the other.

In address master state, the processor drives the bi-directional address interface signals and is permitted to issue processor requests to the PIN bus. In slave state, the processor does not drive the bi-directional address interface signals and accepts external requests from the PIN bus.

In data master state, the processor drives the bi-directional data interface signals and is permitted to send write-back, store or response data to the PIN bus. In slave state, the processor does not drive the bi-directional data interface signals and accepts data responses from the PIN bus.

The coherence interface does not have any bi-directional signals. It is always in master state and driven by the master.

READ PROTOCOL EXAMPLE

Having described the bus interface for the present invention, and particular performance improving aspects of the bus interface, an example of a read operation will now be presented that illustrates the bus interface in operation.

In one embodiment, a processor P0 on the PIN bus will issue a read request when the processor is master of the address bus, when there is a read resource available in the external device (as described above with respect to Flow Control), and if there is no conflicting outstanding external request (if the Read request is a block request). As mentioned above, a processor on the PIN bus may have a number of outstanding read/write requests.

Figure 12:
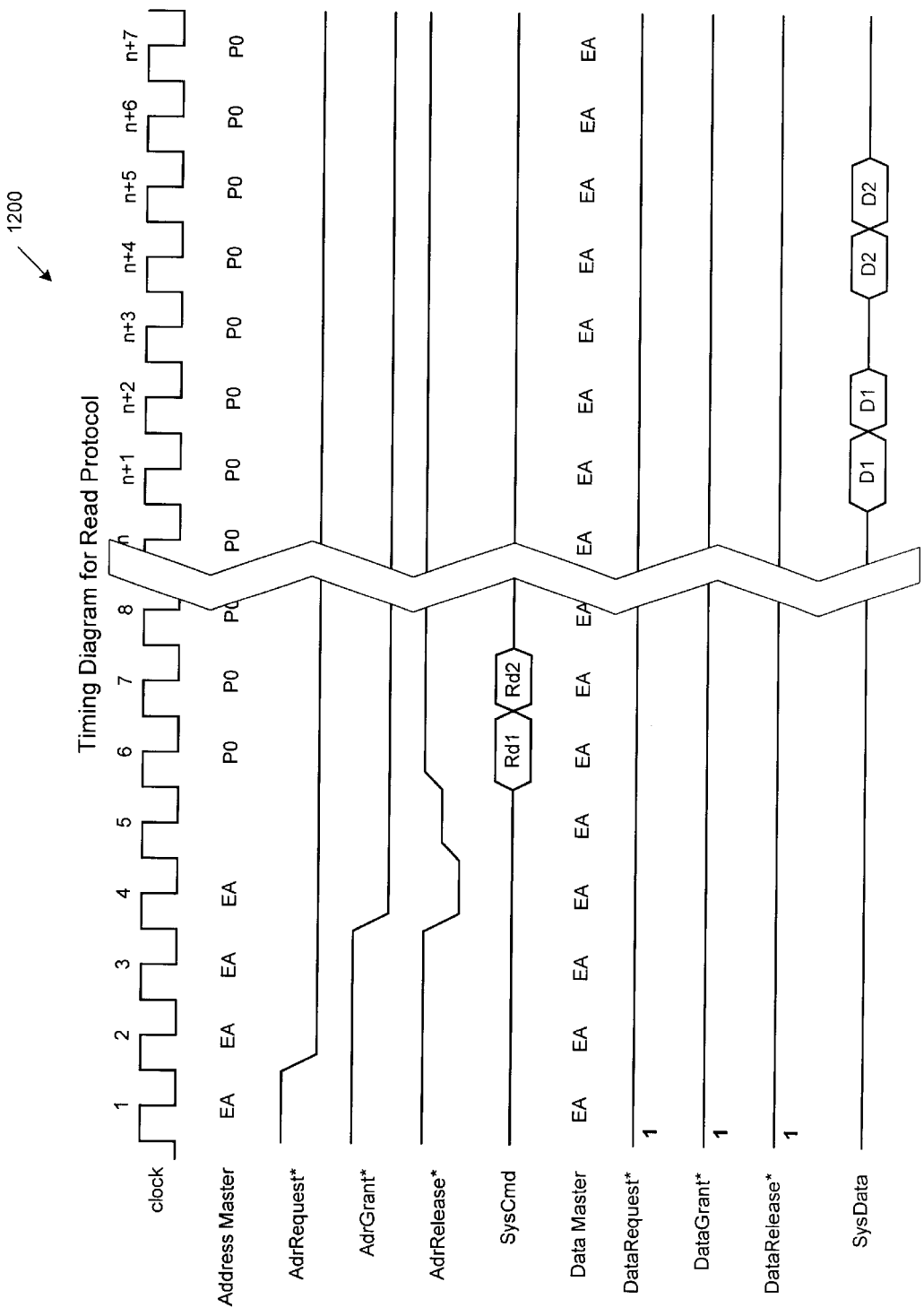
FIG. 12 is a timing diagram illustrating the read protocol of the split-transaction bus according to the present invention.

Referring to FIG. 12, a timing diagram 1200 is presented illustrating the read protocol on the PIN bus. A read is shown to begin when a processor P0 requests access to the address bus by asserting AdrRequest*. Note, if the request were a write, it is possible for the processor P0 to assert DataRequest* commensurate with requesting access to the address bus. The external agent will not grant P0 access to the data bus before it grants access to the address bus.

At clock cycle 4, the external agent drives AdrGrant* and AdrRelease*, as described above in FIG. 10, to grant P0 access to the address bus.

At clock cycle 5, the processor P0 sees AdrGrant* and AdrRelease* and knows that it can drive the address bus in the next cycle.

At clock cycle 6, processor P0 becomes master of the address bus, and drives a read command Rd1 on the command lines. In addition, the processor P0 drives the address associated with Rd1 on the address lines of the PIN bus, and places the transaction ID associated with the request on SysCmdID.

At clock cycle 7, since the processor P0 is still master of the address bus, and since it has another read request, it asserts a second read command Rd2 on the command lines. In addition, the processor P0 drives the address associated with Rd2 on the address lines of the PIN bus, and the transaction ID associated with the request on SysCmdID. While not shown, if the processor P0 had additional read (or write) requests, it could place them on the address bus, as long as it continued to be the address bus master.

At some later clock cycle n+1, the external agent (being the current data bus master), provides data in response to read request Rd1 via the SysData lines of the PIN bus. The external agent also identifies the data by providing its associated transaction ID on SysDataID. In FIG. 12, the data provided requires 2 clock cycles on the data bus.

In one embodiment, a 1-cycle turnaround is required on the data bus between distinct transactions. So, in clock cycle n+4, the external agent (still being the data bus master), drives the data in response to the read request Rd2 via the SysData lines of the PIN bus. The external agent also identifies the data by providing its associated transaction ID on SysDataID.

When the processor P0 notices the data on lines SysData, and associates it with its outstanding transactions via lines SysDataID, it latches the data and marks the request as complete.

Figure 13:
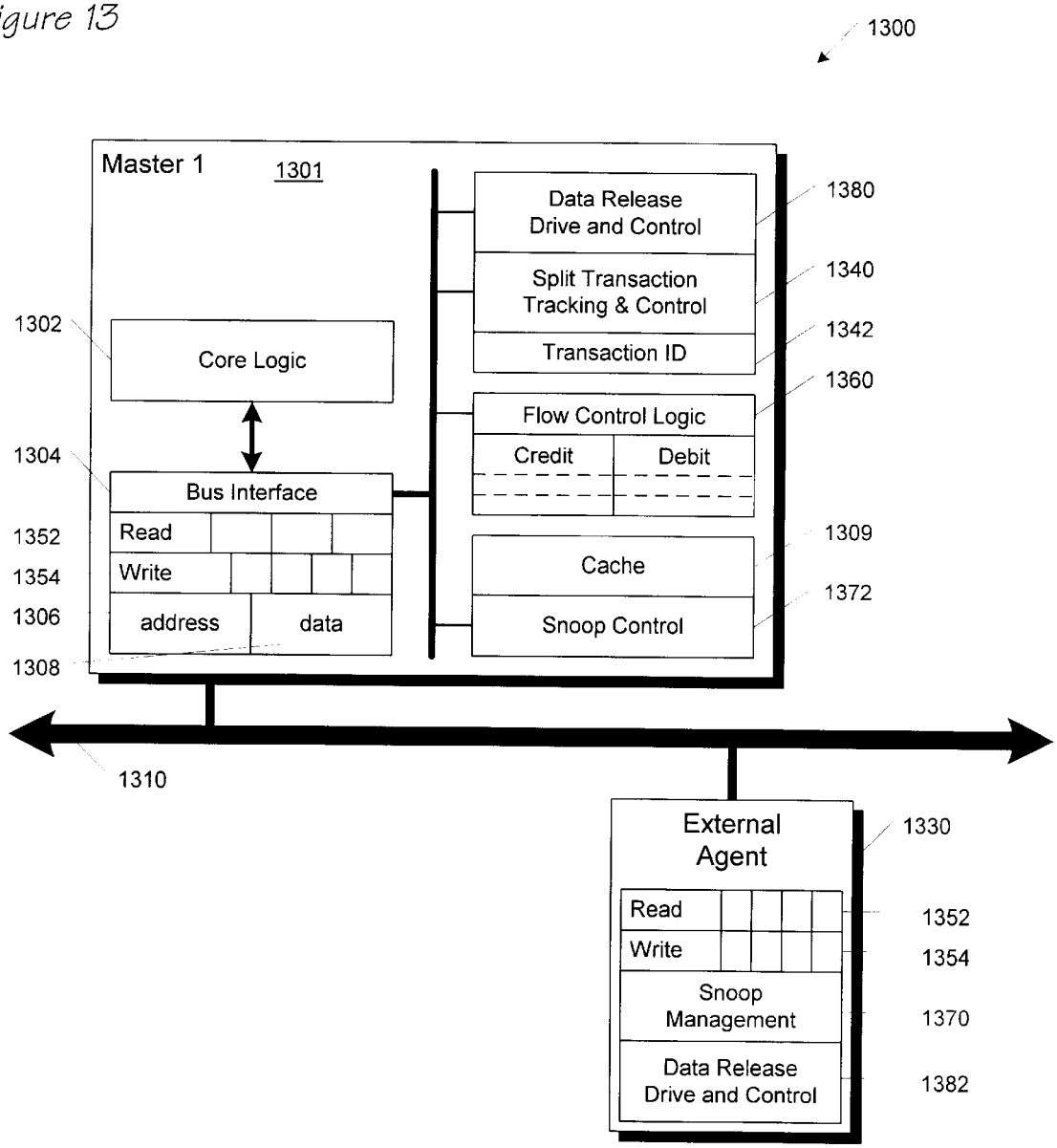
FIG. 13 is a block diagram of a microprocessor incorporating features of the present invention.

Referring now to FIG. 13, a block diagram 1300 is shown of a processor 1301 that incorporates all of the novel bus interface features of the present invention. The processor 1301 is coupled to an external agent 1330 via a system bus 1310.

The processor 1301 includes core logic 1302 coupled to a bus interface 1304. The bus interface 1304 includes an address portion 1306 and a data portion 1308. The bus interface 1304 also includes a read queue 1352 and a write queue 1354. Coupled to the bus interface 1304 are a split transaction tracking and control 1340 having a transaction ID register 1342, flow control logic 1360, snoop control 1372, and data release drive and control 1380. The External agent 1330 includes a read and write queues 1352, 1354, snoop management 1370, and data release drive and control 1382. Each of the elements shown in FIG. 1300 operate as described above with reference to FIGS. 3–12.

Although the present invention and its objects, features, and advantages have been described in detail, other embodiments are encompassed by the invention. For example, one skilled in the art will appreciate that the design described above may be embodied in a computer readable medium. Such embodiment may be in the form of VHSIC Hardware Description Language (VHDL) or a behavior model such as RTL, stored on a hard disk, or other permanent medium that is readable by a computer.

In addition, the above discussion often presents a single processor coupled to an external agent via a system bus. One skilled in the art will appreciate that in all cases where a single processor is shown, multiple processors are anticipated. The single processor illustration merely provided a method for pointing out a particular aspect of the invention.

In addition, elements of the PIN bus interface of the present invention have been described both separately, and together. These include: split-transactions, transaction ID's, credit based flow control, coherent I/O, data release, etc. Applicants anticipate that these novel features may be combined in a variety of ways, depending on the needs of the computing environment into which the PIN bus will be used.

Furthermore, the bus interface of the present invention has been particularly described with reference to a microprocessor and an external agent. One skilled in the art will appreciate that any type of device, whether slave or master, that requires access to a system bus, may be designed to incorporate the novel features of the present invention.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A bus interface for a computing environment comprising:

split transaction tracking and control for establishing transaction ID's for transactions to be presented on a computing bus having address and data buses, wherein said transactions have split address and data portions; and flow control logic, coupled to said split transaction tracking and control, for determining whether devices being read from, or written to, by said transactions, have buffers currently available to respond to said transactions, wherein said flow control logic comprises:
a plurality of credit read counters, for tracking the number of available read buffers in said devices; and
a plurality of credit write counters, for tracking the number of available write buffers in said devices;

wherein if said flow control logic determines that said devices do not have buffers currently available to respond to said transactions, said flow control logic causes said transactions to not be presented until said buffers are available.

2. The bus interface as recited in claim 1 wherein the bus interface is incorporated into a processing device to allow said processing device to communicate with said devices that are external to it.

3. The bus interface as recited in claim 1 wherein said split transaction tracking and control further comprises:

a transaction tag buffer, for temporarily storing said transaction ID's so that they may be presented along with said transactions on the bus interface.

4. The bus interface as recited in claim 1 wherein said split address and data portions of said transactions are presented separately to said address and data buses.

5. The bus interface as recited in claim 1 wherein said transactions comprise:

a memory read;

a memory write;

an I/O read; or an I/O write.

6. The bus interface as recited in claim 1 wherein said transaction ID's comprise:

a device ID, for identifying a device that initiates one of said transactions; and a transaction tag, for identifying a particular one of said transactions.

7. The bus interface as recited in claim 1 further comprising:

snoop control, coupled to said split transaction and control, for examining said address bus, and for determining whether an address from one of said devices corresponds to data residing in an associated cache.

8. The bus interface as recited in claim 3 wherein each of said transactions that are pending on the bus interface has a unique one of said transaction ID's.

9. The bus interface as recited in claim 6 wherein said transaction tag comprises a 4-bit field for identifying up to sixteen distinct transactions.

10. The bus interface as recited in claim 1 wherein one of said transaction ID's is presented along within said address portion for each of said transactions.

11. The bus interface as recited in claim 10 wherein one of said transaction ID's is also presented along with said data portion for its associated one of said transactions.

12. The bus interface as recited in claim 1 wherein each of said credit read counters is associated with one of said devices having said read buffers.

13. The bus interface as recited in claim 12 wherein each of said credit write counters is associated with one of said devices having said write buffers.

14. The bus interface as recited in claim 12 wherein as said transactions are presented to said devices, said flow control logic reduces the number of available read/write buffers for said devices in said plurality of credit read/credit write counters, respectively.

15. The bus interface as recited in claim 12 wherein as said devices complete said transactions, and clear said number said available read/write buffers, said flow control logic increases said number of available read/write buffers for said devices in said plurality of credit read/credit write counters, respectively.

16. The bus interface as recited in claim 15 wherein said devices provide said flow control logic with read/write credit signals as said read/write buffers are cleared.

17. The bus interface as recited in claim 7 wherein said snoop control provides a signal via the bus interface indicating whether said address from one of said devices corresponds to data residing in said associated cache.

18. The bus interface as recited in claim 7 wherein if said snoop control determines that said address from one of said devices corresponds to data residing in said associated cache, said snoop control provides a signal indicating a state for said data.

19. The bus interface as recited in claim 18 wherein said state for said data comprises:

clean;

dirty; or invalid.

20. A bus interface for a computing environment comprising:

split transaction tracking and control for establishing transaction ID's for transactions to be presented on a computing bus having address and data buses, wherein said transactions have split address and data portions;

flow control logic, coupled to said split transaction tracking and control, for determining whether devices being read from, or written to, by said transactions, have buffers currently available to respond to said transactions; and data release drive and control, coupled to said split transaction tracking and control, for driving a data release signal onto the computing bus commensurate with a last cycle of said data portions of said transactions that are presented by the bus interface;

wherein if said flow control logic determines that said devices do not have buffers currently available to respond to said transactions, said flow control logic causes said transactions to not be presented until said buffers are available.

21. The bus interface as recited in claim 20 wherein by driving said data release signal commensurate with said last cycle, latency between said data portions of said transactions is reduced.

22. A bus interface having separate address and data interfaces coupled to address and data buses on a split transaction bus, for allowing out-of-order completion of split address/data transactions, the bus interface comprising:

split transaction tracking and control for generating a transaction ID to be associated with each address provided by the bus interface to the address bus, and for examining transaction ID's that are associated with data on the data bus to determine whether said data on the data bus corresponds to a transaction initiated by the bus interface; and flow control logic, coupled to the address and data interfaces, for determining whether devices that are to be read from, or written to, by transactions to be initiated by the bus interface have buffers currently available to respond to said transactions, wherein said flow control logic further comprises:

a plurality of credit read counters, for tracking the number of available read buffers in said devices; and a plurality of credit write counters, for tracking the number of available write buffers in said devices.

23. The bus interface as recited in claim 22 wherein if said split transaction tracking and control determines that said data on the data bus corresponds to said transaction initiated by the bus interface, said split transaction tracking and control causes said data to be latched by the data interface.

24. The bus interface as recited in claim 22 wherein transaction ID's generated by said split transaction tracking and control are unique for all pending transactions.

25. The bus interface as recited in claim 22 wherein if said flow control logic determines that said devices that are to be read from, or written to, by said transactions to be initiated by the bus interface, do not have buffers currently available, said flow control logic causes said transactions to wait until said buffers are available.

26. The bus interface as recited in claim 22 further comprising:

snoop control, coupled to the address bus, for examining the address bus, and for determining whether an address from one of said devices corresponds to data residing in an associated cache.

27. The bus interface as recited in claim 23 wherein said snoop control provides a signal via the bus interface indicating whether said address from one of said devices corresponds to data residing in said associated cache.

28. A bus interface having separate address and data interfaces coupled to address and data buses on a split transaction bus, for allowing out-of-order completion of split address/data transactions, the bus interface comprising:

split transaction tracking and control for generating a transaction ID to be associated with each address provided by the bus interface to the address bus, and for examining transaction ID's that are associated with data on the data bus to determine whether said data on the data bus corresponds to a transaction initiated by the bus interface;

flow control logic, coupled to the address and data interfaces, for determining whether devices that are to be read from, or written to, by transactions to be initiated by the bus interface have buffers currently available to respond to said transactions; and data release drive and control, coupled to the data interface, for driving a data release signal onto the split transaction bus commensurate with a last cycle of data portions of the split address/data transactions that are presented by the bus interface.

29. A computer program product for use with a computing device, the computer program product comprising:

a computer usable medium having computer readable program code embodied in said medium for causing a computing bus interface to be developed, said computer readable program code comprising:

first computer readable program code for providing split transaction tracking and control to establish transaction ID's for transactions to be presented on a computing bus having address and data buses, wherein said transactions have split address and data portions;

second computer readable program code for providing flow control logic to determine whether devices being read from, or written to, by said transactions, have buffers currently available to respond to said transactions; and third computer readable program code for providing data release drive and control to drive a data release signal onto said computing bus commensurate with a last cycle of data portions of said transactions that are presented by said computing bus interface.

30. The computer program product, as recited in claim 28 wherein if said flow control logic determines that said devices do not have buffers currently available to respond to said transactions, said flow control logic causes said transactions to wait until said buffers are available.

31. The computer program product, as recited in claim 30 further comprising:

fourth computer readable program code for providing snoop control to examine said address bus, and determine whether an address from one of said devices corresponds to data residing in an associated cache.

* * * * *